United States Patent [19]

Warner et al.

[11] Patent Number: 5,490,581

[45] Date of Patent: Feb. 13, 1996

[54] SURFACE MOUNTED MODULAR FIXTURE FOR ELEVATORS

[75] Inventors: Donald B. Warner, Glenview; John T. Andrews, Chicago; Mark D. Menke, Highland Park; Marc A. Cooperman, Lindenhurst; Jan Tornes, Des Plaines, all of Ill.

[73] Assignee: Inventio AG, Hergiswil NW, Switzerland

[21] Appl. No.: 311,179

[22] Filed: Sep. 23, 1994

[51] Int. Cl.$^6$ .................................................. B66B 7/00
[52] U.S. Cl. ..................... 187/414; 187/395; 340/815.53
[58] Field of Search .................................... 187/395, 397, 187/391, 398, 399, 414; 340/332, 286.11, 815.53

[56] References Cited

U.S. PATENT DOCUMENTS

| D. 83,457 | 2/1931 | Lighthipe . | |
|---|---|---|---|
| 1,028,089 | 5/1912 | Herzog | 187/395 |
| 1,835,508 | 12/1931 | Lucas | 187/397 |
| 2,998,500 | 8/1961 | Carlo | 187/395 |
| 3,174,023 | 3/1965 | Doggart | 200/167 |
| 4,032,882 | 6/1977 | Mandel et al. | 340/19 R |
| 5,379,865 | 1/1975 | Berdich et al. | 187/395 |

FOREIGN PATENT DOCUMENTS

| 9102425 | 6/1991 | Germany . |
| 279834 | 9/1950 | Switzerland . |

*Primary Examiner*—Kenneth Noland
*Attorney, Agent, or Firm*—Howard & Howard

[57] ABSTRACT

An elevator fixture includes a base plate module with opposed bent ends for mounting on a wall surface, and a housing open at the rear side to receive the base plate module and detachably couple the housing to the base plate module. The housing is formed from a face plate module and a frame module. The face plate module has one or more apertures through which call buttons or other indicating devices extend. The frame module is formed from a plurality of frame portions which are cut to length from an extrusion to match the dimensions of the face plate module. The frame portions are releasably coupled together by tabs and setscrews to releasably retain the face plate. Thus, the fixture can be assembled by selecting from among a plurality of different base plate, face plate and frame modules. The base plate module can include a positioning indicator and a positioning aperture for locating the fixture relative to an existing wall recess and/or in accordance with regulations.

20 Claims, 4 Drawing Sheets

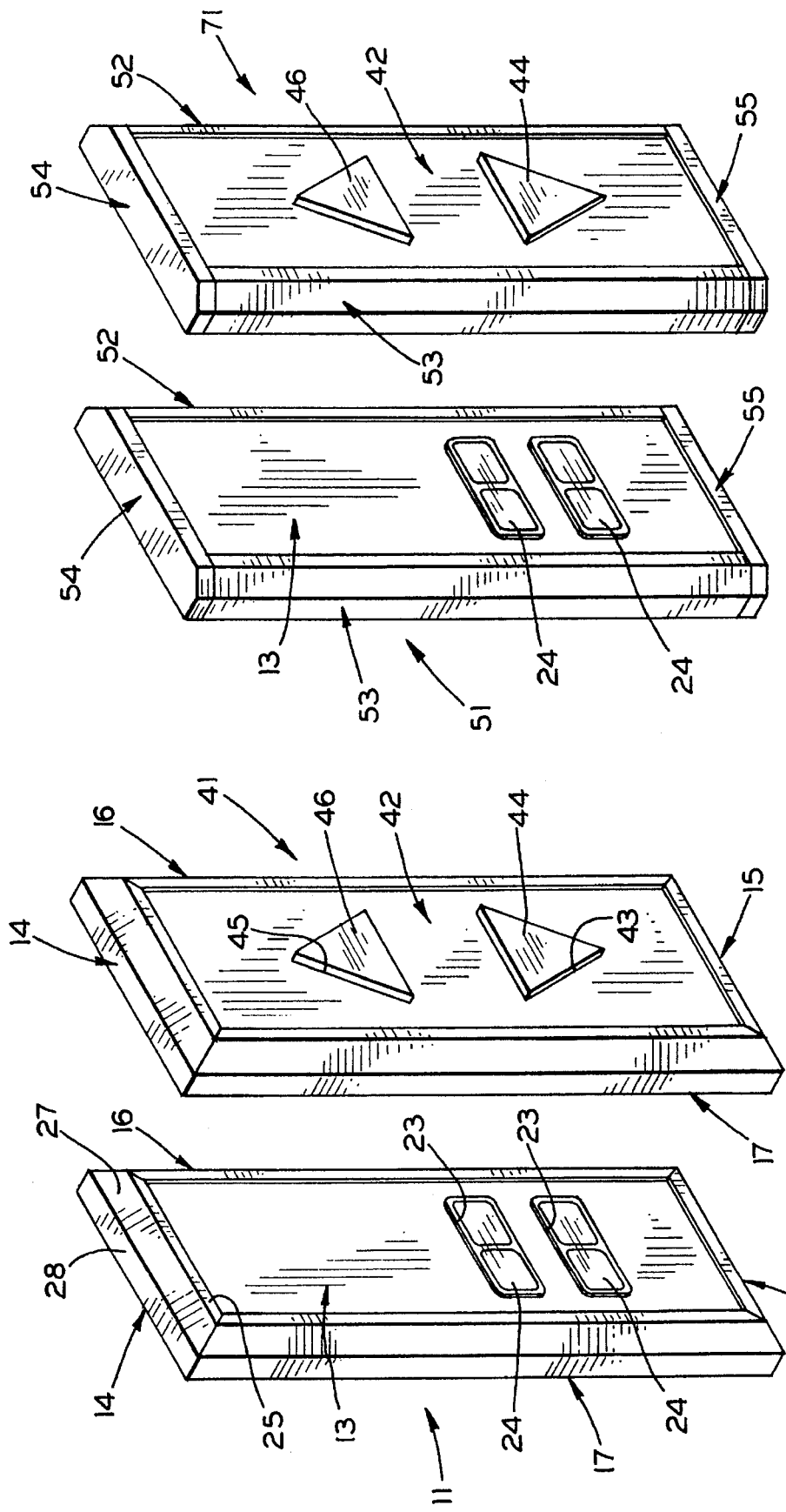

5,490,581

SURFACE MOUNTED MODULAR FIXTURE FOR ELEVATORS

BACKGROUND OF THE INVENTION

The present invention relates generally to elevator fixtures and, in particular, to surface mounted hall call fixtures.

A fixture, which is used for switching and signaling purposes and which can receive switches, floor indicators and traveling direction indicators in a housing, is shown in the Swiss patent specification CH 270 934. The housing is set into a wall recess and terminated flush with the wall by a cover plate. In the case of fixtures which are used as traveling direction indicators, incandescent bulb holders are arranged in the housing with incandescent bulbs. In that case, a glass pane carrying an arrow is positioned in a recess at the upper rim of the housing and a transparent matte glass pane is inserted into a slot formed in the cover plate.

A disadvantage of the fixture described above is that expensive wall recesses are required, which appreciably increase on-site assembly operations. Normally, the wall recesses must be formed during the construction 0f the building. For this purpose, personnel expert in elevator systems are required at the building site before the actual elevator assembly. A further disadvantage is that, in the case of subsequent modification or modernization of an elevator plant, the wall recesses can not be relocated at any desired locations about the elevator portal without increased effort and expense.

Recent federal legislation has required that the push buttons on hall fixtures be located forty-two inches above the finished floor. In buildings constructed before the legislation was enacted, the push button hall fixtures are mounted much higher than forty-two inches. In order to relocate such fixtures, a new recess must be formed in the wall to receive the fixture and the old recess must be covered and the wall refinished. Such a process is extremely time consuming and expensive, especially where the walls are finished with marble, concrete or similar building materials.

One solution to this problem has been to provide a fixture which extends from the existing recess downwardly along the surface of the wall. The push buttons are mounted in the lower end of such fixture at the regulated height. Such fixture uses a surface mounted base plate that is attached to the wall and a housing which covers the base plate and is removably attached thereto. The housing is formed of a single sheet of metal which is formed into a box-like shape with an open rear for receiving the base plate. Such construction is relatively expensive since the sheet metal must be subjected to several drawing and/or bending and/or welding operations. Furthermore, the requirements for the shape and the size of the housing can vary between elevator installations such that many such installations require custom sizes which cannot be mass produced.

SUMMARY OF THE INVENTION

The present invention concerns an apparatus for indicating the operation of an elevator. The invention avoids the disadvantages of the above-described known fixtures by providing a fixture which can be mounted without a wall recess which otherwise might impair the aesthetic appearance of the elevator portal and can easily be assembled from modular parts to accommodate various installation shape and size parameters.

The fixture comprises a generally planar face plate having edges and at least one aperture formed therein for receiving an indicating device; a frame surrounding the edges of the face plate and releasably retaining the face plate, the frame and the face plate forming a box-like housing having side walls extending rearwardly from the face plate and an open rear side for facing toward a wall surface, the frame including an upper frame portion, a lower frame portion and two side frame portions; and fastener means for releasably coupling the frame portions together, the side frame portions having means for slidably retaining the fastener means. The fixture also includes a generally planar base plate having upper and lower end edges and means for attachment to the wall surface, the base plate being sized for insertion into the open rear side of the housing; and means for detachably coupling the frame to the base plate at the open rear side of the housing whereby when the base plate is attached to the wall surface, the upper and lower end edges of the base plate extend into the open rear side of the housing, the means for detachably coupling releasably engages the upper and lower end edges of the base plate and the housing encloses and covers the base plate in cooperation with the wall surface.

The means for slidably retaining the fastener means includes a generally U-shaped channel formed in each of the side frame portions and the fastener means includes a pair of tabs attached to each of the upper and lower frame portions and a plurality of setscrews, each of the tabs for insertion into the channel of an adjacent one of the side frame portions, each of the tabs having a threaded aperture formed therein for receiving one of the setscrews whereby rotation of the setscrews into engagement with associated walls of the channels releasably couples the tabs to the side frame portions.

The advantages achieved by the present invention are that any arrangement of the fixture is possible, independent of building construction, thanks to the simple mounting and modular construction of the fixture. A further advantage is that the fixture offers protection to a large extent against unauthorized opening.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a perspective view of the elevator fixture according to the present invention;

FIG. 2 is a perspective view of the elevator fixture shown in the FIG. 1 with an alternate face plate and push buttons;

FIG. 3 is a perspective view of an alternate embodiment of the elevator fixture according to the present invention;

FIG. 4 is a perspective view of the elevator fixture shown in the FIG. 3 with the alternate face plate and push buttons shown in the FIG. 2;

DESCRIPTION OF THE PREFERRED EMBODIMENT

Figure 5:
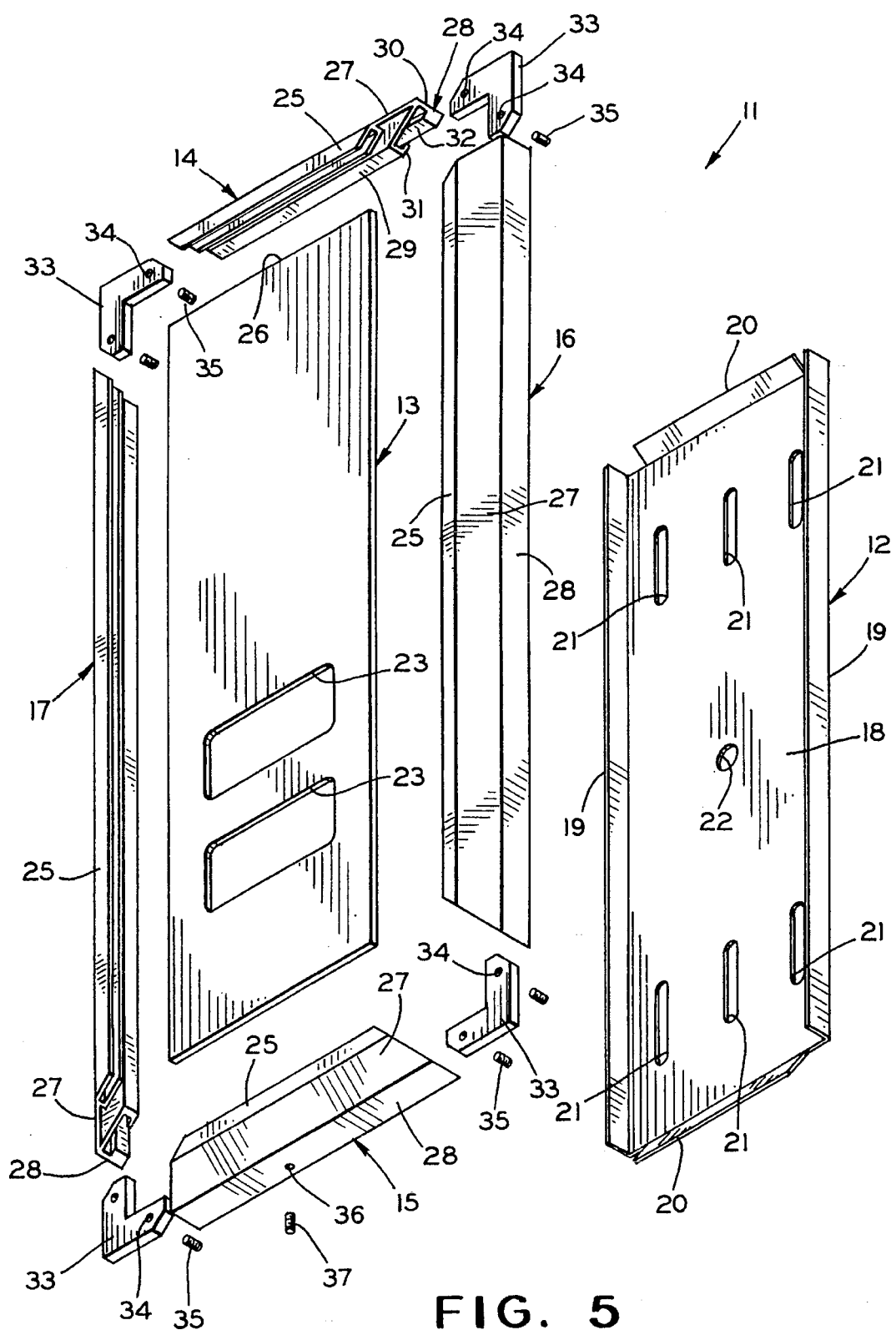
FIG. 5 is an exploded perspective view of the fixture shown in the FIG. 1.

There is shown in the FIGS. 1 and 5 a surface mounted elevator fixture 11 according to the present invention. The fixture 11 is of modular construction formed of a base plate module, a face plate module and a frame module. The fixture 11 includes a base plate 12 as the base plate module, a face plate 13 as the face plate module, and the frame module formed of an upper frame portion 14, a lower frame portion 15, a right side frame portion 16 and a left side frame portion 17. As shown in the FIG. 5, the base plate 12 includes a generally planar central portion 18 bounded by a pair of longer, generally vertically extending side edges 19 and a pair of shorter, generally horizontally extending end edges 20. The side edges 19 are bent transverse to the plane of the central portion 18 and extend forwardly toward a rear surface of the face plate 13 when the fixture 11 is mounted on a relatively flat vertical surface such as a wall in the hallway of a building. A plurality of elongated apertures 21 are formed in the central portion 18 adjacent to each of the end edges 20. The apertures 21 are adapted to receive fasteners (not shown) which are utilized to securely fasten the base plate 12 to the wall surface. The apertures 21 are elongated in a generally vertically extending direction to permit vertical adjustment of the base plate 12 relative to the finished floor of the building as will be discussed below. Also, a positioning aperture 22 is formed in the central portion 18 for use in aligning the base plate 12 on the wall as will be discussed below.

The face plate 13 is generally planar and has a pair of indicator apertures 23 formed therein adjacent a lower edge thereof. As shown in the FIG. 1, a pair of push buttons 24 can be mounted in the apertures 23 respectively such that the push buttons are accessible to a person standing in the hallway adjacent to the fixture 11. The push buttons 24 actuate conventional switches (not shown) which are located inside the fixture 11 and can be attached to either the front surface of the base plate 12 or the rear surface of the face plate 13. Wiring (not shown) connecting the switches to the control for the elevator can be directed through an aperture (not shown) in the base plate 12 into the existing recess in the wall where electrical connection is made to the existing elevator control wiring. The push buttons 24 are utilized to generate hall calls and can be lighted to indicate that a hall call has been registered.

The face plate 13 is surrounded by the frame module formed of the frame portions 14 through 17. When connected together, the frame portions releasably retain the face plate 13 and serve to removably attach the frame module and face plate to the base plate 12. Each of the frame portions 14 through 17 is cut from a length of extruded metal such as aluminum. Thus, different length frame portions do not need to be stocked and can be immediately fashioned to the precise dimensions of the face plate 13 or any other face plate module to be utilized.

As shown in the FIG. 5, the upper frame portion 14 includes a generally U-shaped longitudinally extending channel portion 25 which has an opening for receiving an upper edge 26 of the face plate 13. The channel portion 25 is attached to a wall portion 27 which, in the mounting position shown, extends rearwardly and upwardly from the upper edge 26 of the face plate 13. In turn, the wall portion 27 is attached to a generally U-shaped larger channel portion 28. The channel portion 28 has a shorter leg 29 and a longer leg 30 each of which extends rearwardly toward the base plate 12. A free edge of the shorter leg 29 has a flange 31 formed thereon which extends toward the longer leg 30. The longer leg 30 has a relatively thicker flange 32 formed thereon extending toward the shorter leg 29. The ends of the upper frame portion 14 are cut at an approximately forty-five degree angle. As stated above, the frame portions 15 through 17 are fashioned from the same extrusion as the frame portion 14 and, therefore, have the same cross section. The length of each of the frame portions 14 through 17 is such that the adjacent angled ends abut and each edge of the face plate 13 is releasably retained in the channel portion 25 of the associated frame portion.

The abutting frame portions are connected together by generally L-shaped tabs 33. Each of the tabs has a pair of legs which slidably engage the larger channel portions 28 of the abutting frame portions. The flanges 31 and 32 prevent the tabs 33 from exiting the longitudinally extending opening of the channel 28. Each of the legs of the tabs 33 has a threaded aperture 34 formed therein. The apertures 34 are located so that they are accessible through the opening of the larger channel portions 28. Each of the apertures 34 receives a threaded fastener 35 such as a setscrew. The threaded fastener 35 is rotated until one end thereof engages the inner surface of the bottom of the channel portion 28 thereby forcing the corresponding leg of the tab 33 against the flanges 31 and 32 to securely connect the frame portions 14 through 17 together.

The face plate module and the frame module form a housing having an open rear side, the face plate 13 as the front side and the frame portions 14 through 17 as side walls extending rearwardly from the face plate. A threaded aperture 36 is formed in the larger channel portion 28 of the lower frame portion 15. A setscrew 37 is rotated into the aperture 36. The open rear side of the housing is of a size such that the base plate 12 extends into the housing. The housing then is releasably attached to the base plate 12 by engagement of the flange 32 on the upper frame portion 14 with the upper end edge 20 and rotation of the setscrew 37 into engagement with the lower end edge 20 such that the housing is drawn toward the vertical surface of a wall on which the base plate 12 is mounted and the base plate is enclosed by the housing and the wall surface.

There is shown in the FIG. 2 a push button fixture 41 similar in construction to the fixture 11, but having an alternate embodiment face plate module. The fixture 41 includes the frame module formed of the frame portions 14 through 17 which surround and releasably retain a face plate 42 having a lower aperture 43 formed therein. A push button 44 extends through the aperture, and the aperture and the push button are formed in the shape of a downwardly directed arrowhead for registering and indicating down hall calls. An upper aperture 45 is also formed in the face plate 42 and a second push button 46 extends through the upper aperture. The aperture 45 and the push button 46 are formed as an upwardly directed arrowhead for registering and indicating up hall calls. Although only two different push button shapes and locations are shown in association with the fixtures 11 and 41, other combinations are possible including a single aperture and push button for the lowermost and uppermost floors in a building served by the associated elevator and a push button with a separate spaced apart indicator light. Furthermore, apertures can be provided in the face plate module for acoustical devices such as speakers and indicating devices such as floor number displays.

Figure 6:
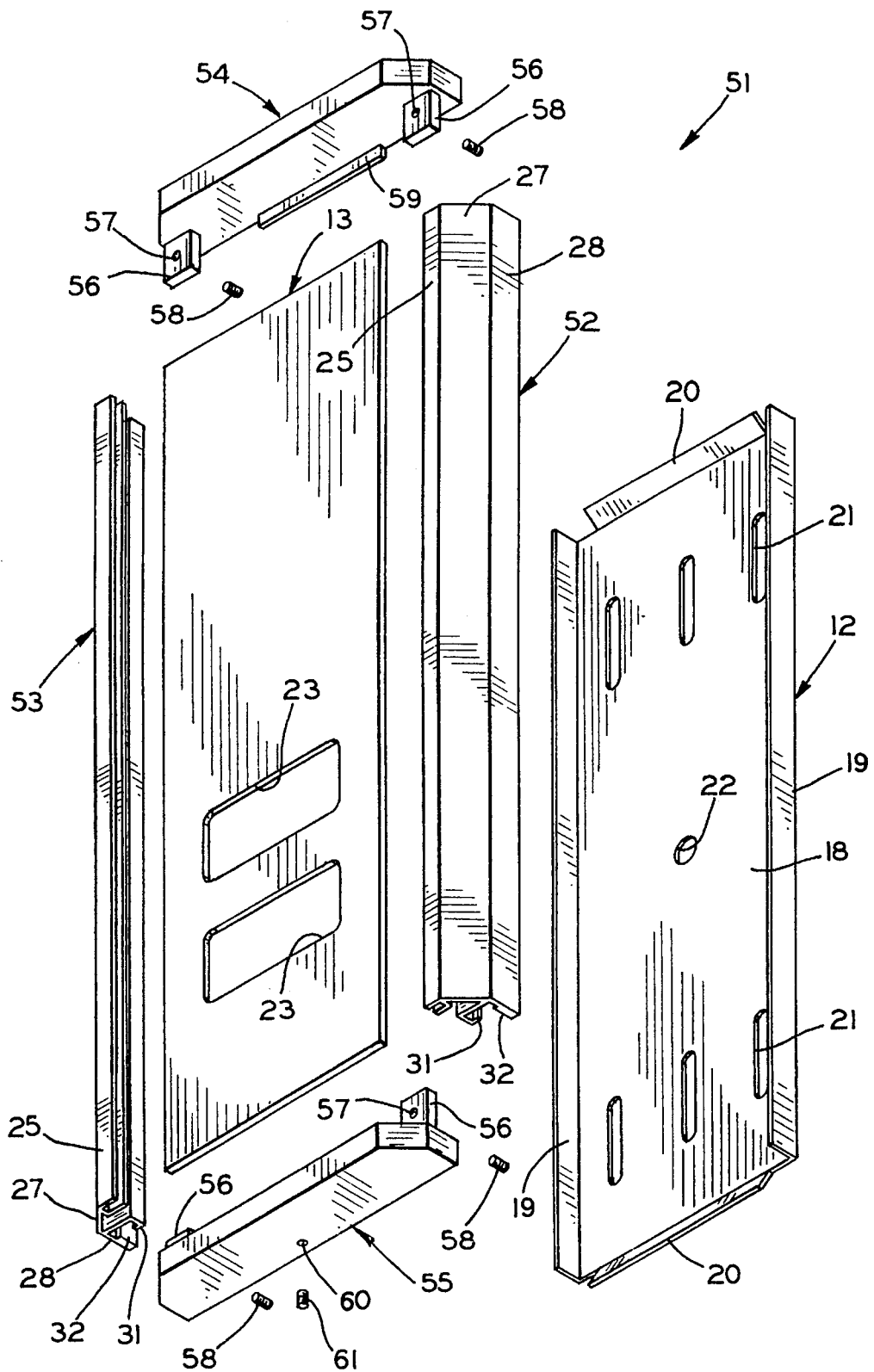
FIG. 6 is an exploded perspective view of the fixture shown in the FIG. 3.

An alternate embodiment of the fixture 11 is shown in the FIGS. 3 and 6. A fixture 51 utilizes the previously described base plate 12 and the face plate 13. A frame module is formed from a right side frame portion 52, a left side frame portion 53, an upper frame portion 54 and a lower frame portion 55. The frame portions 52 and 53 are formed from the same extrusion as the frame portions 14 through 17. However, the frame portions 52 and 53 have ends which are transverse to the longitudinal axis of the frame portions. The frame portions 52 and 53 are cut to the same length as the vertical dimension of the face plate 13. Upper ends of the frame portions 52 and 53 abut the upper frame portion 54 and lower ends of the frame portions abut the lower frame portion 55. Each of the frame portions 54 and 55, or end caps, has a pair of tabs 56 formed thereon. The tabs 56 are spaced apart a distance equal to the spacing between the larger channel portions 28 of the frame portions 52 and 53 when the smaller channel portions 25 engage the longer edges of the face plate 13. Thus, the tabs 56 are slidably received in the channel portions 28 in a manner similar to the legs of the tabs 33. Each of the tabs 56 has a threaded aperture 57 formed therein for receiving a setscrew 58 therein. The frame portions 52 and 53 are releasably attached to the end caps 54 and 55 by rotating the setscrews 58 into engagement with the inner surfaces of the channel portions 28 thereby forcing the tabs 56 against the flanges 31 and 32. Thus, when assembled, the face plate 13, the frame portions 52 and 53, and the end caps 54 and 55 form a housing having an open rear side into which the base plate 12 extends. The end cap 54 has a flange 59 formed thereon which flange extends parallel to the plane of the face plate 13. The flange 59 engages the upper end edge 20 of the base plate 12. The lower end cap 55 has a threaded aperture 60 formed therein for receiving a threaded fastener such as a setscrew 61. The setscrew 61 is rotated in the aperture 60 and into engagement with the lower end edge 20 to releasably secure the housing to the base plate 12. Of course, the locations of the end caps 54 and 55 could be reversed, or the end cap 55 could be replaced by another one of the end cap 54.

There is shown in the FIG. 4 a hall call fixture 71 which utilizes the face plate 42, the push buttons 44 and 46, the side frame portions 52 and 53 and the end frame portions 54 and 55. Of course, the extrusion from which the frame portions are formed can have other cross-sectional shapes and the face plate could be used to display signage which would not require apertures. Clearly, the face plate modules and the frame modules described above can be combined to provide different housings.

Figure 7:
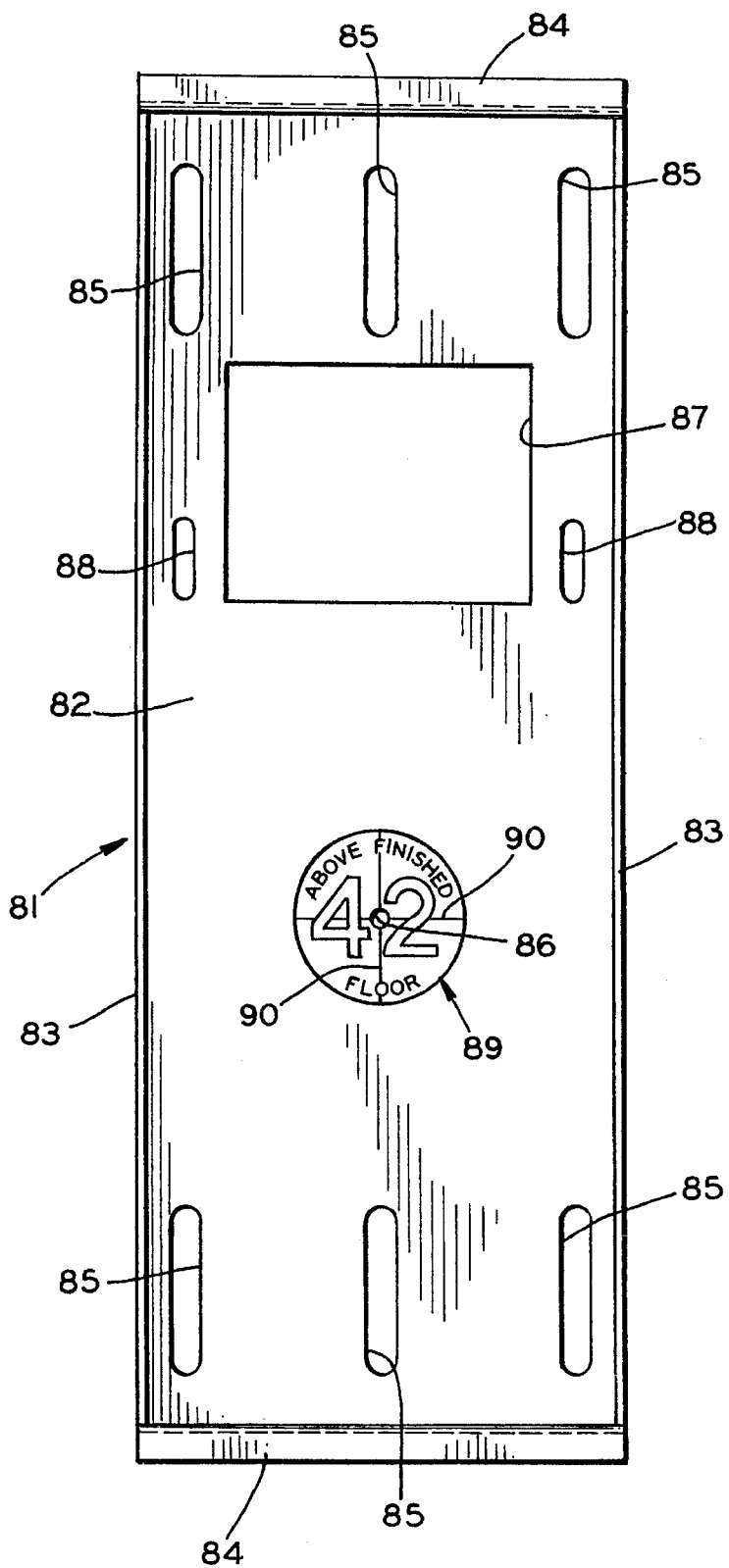
FIG. 7 is a front elevation view of an alternate embodiment of the base plate shown in the FIG. 5.
Figure 8:
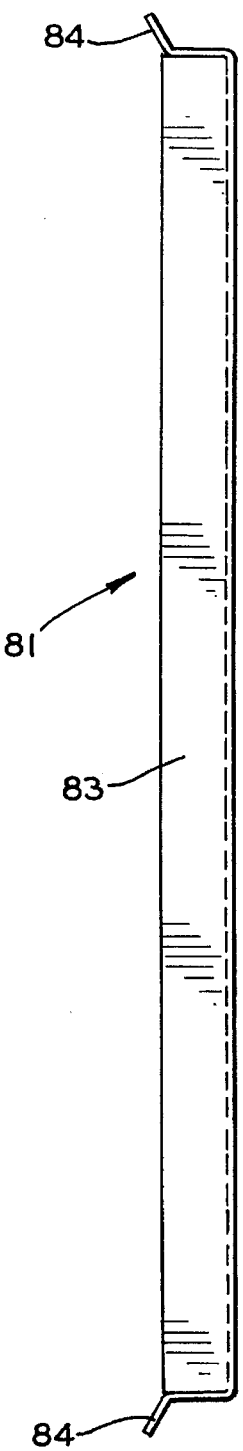
FIG. 8 is a right side elevation view of the base plate shown in the FIG. 7.

There is shown in the FIGS. 7 and 8, a base plate 81 which is similar to the base plate 12 shown in the FIGS. 5 and 6. The base plate 81 has a generally rectangular planar central portion 82 with a pair of elongated side edges 83 which extend forwardly transverse to the plane of the central portion 82. The base plate 81 also has a pair of end edges 84 which are bend transverse to the plane of the central portion 81 and then are bent at an angle such that they extend forwardly and outwardly in a manner similar to the end edges 20 of the base plate 12. A plurality of elongated apertures 85 are formed adjacent the upper and lower ends of the base plate 81 for securing the base plate to a wall surface with fasteners (not shown). A positioning aperture 86 is formed in the central portion 82 for use as a locating means as described below. A generally rectangular aperture 87 is formed in the central portion 82. The aperture 87 can be utilized as a passage for wiring which extends between indicating devices mounted inside the fixture and the elevator control system. The aperture 87 also can be utilized to mount a key switch or similar device with the aid of a pair of elongated apertures 88 formed in the central portion 82 for receiving fastening means (not shown) by which any such device is attached to the base plate 81.

The positioning apertures 22 and 86 are utilized for installing the fixture at the proper height prescribed by the Americans with Disabilities Act (28 C.F.R. Part 36). The ADA requires that a hall call fixture be mounted with the center line of the call buttons forty-two inches above the finished floor. A positioning indicator 89 is provided on the outwardly facing surface of the central portion 82. The indicator 89 can be any suitable means such as a sticker which has printed thereon a pair of cross lines 90 which intersect at the center of the aperture 86. The hall call fixture can be installed at the required height by scribing an horizontal line on the wall surface forty-two inches from the finished floor surface and locating the aperture 86 on the scribed line such that the horizontally extending one of the lines 90 is aligned with the scribed line and the vertically extending one of the lines 90 is aligned with an existing recess located above the scribed line. Now fasteners can be inserted into the apertures 85 and threaded into securing means which are installed in the wall to fix the base plate 81 in the proper position for installation of the associated housing containing the call buttons.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A surface mounted fixture for elevators having at least one indicating device mounted therein to signal an operational state of an associated elevator comprising:

a generally planar face plate having edges and at least one aperture formed therein for receiving the indicating device;

a frame surrounding said edges of said face plate and releasably retaining said face plate, said frame and said face plate forming a box-like housing having side walls extending rearwardly from said face plate and an open rear side for facing toward a wall surface;

a generally planar base plate having upper and lower end edges and means for attachment to the wall surface, said base plate being sized for insertion into said open rear side of said housing; and means for detachably coupling said frame to said base plate at said open rear side of said housing whereby when said base plate is attached to the wall surface, said upper and lower end edges of said base plate extend into said open rear side of said housing, said means for detachably coupling releasably engages said upper and lower end edges of said base plate and said housing encloses and covers said base plate in cooperation with the wall surface.

2. The fixture according to claim 1 wherein said frame includes a plurality of frame portions, at least one of said frame portions having means for releasably retaining one of said edges of said face plate, and fastener means for releasably coupling said frame portions together.

3. The fixture according to claim 2 wherein said means for releasably retaining one of said edges of said face plate is a generally U-shaped channel formed in said one frame portion.

4. The fixture according to claim 1 wherein said frame includes a plurality of frame portions and including fastener means for releasably coupling said frame portions together, at least one of said frame portions having means for slidably retaining said fastener means.

5. The fixture according to claim 4 wherein said means for slidably retaining said fastener means is a generally U-shaped channel formed in said one frame portion and said fastener means includes a tab for insertion into said channel and a setscrew, said tab having a threaded aperture formed therein for receiving said setscrew whereby rotation of said setscrew into engagement with a wall of said channel releasably couples said tab to said one frame portion.

6. The fixture according to claim 1 wherein said frame includes an upper frame portion, a lower frame portion and two side frame portions and including fastener means for releasably coupling said frame portions together, at least said side frame portions having means for slidably retaining said fastener means.

7. The fixture according to claim 6 wherein said means for slidably retaining said fastener means is a generally U-shaped channel formed in each of said frame portions and said fastener means includes a plurality of tabs and a plurality of setscrews, each of said tabs having a pair of legs for insertion into said channels of adjacent ones of said frame portions, each of said legs having a threaded aperture formed therein for receiving one of said setscrews whereby rotation of said setscrews into engagement with associated walls of said channels releasably couples said tabs to said frame portions.

8. The fixture according to claim 1 wherein said frame includes an upper frame portion, a lower frame portion and two side frame portions and including fastener means for releasably coupling said frame portions together, said side frame portions having means for slidably retaining said fastener means.

9. The fixture according to claim 8 wherein said means for slidably retaining said fastener means is a generally U-shaped channel formed in each of said side frame portions and said fastener means includes a pair of tabs attached to each of said upper and lower frame portions and a plurality of setscrews, each of said tabs for insertion into said channel of an adjacent one of said side frame portions, each of said tabs having a threaded aperture formed therein for receiving one of said setscrews whereby rotation of said setscrews into engagement with associated walls of said channels releasably couples said tabs to said side frame portions.

10. The fixture according to claim 1 wherein said base plate has a positioning aperture formed therein for cooperation with a mark on the wall surface to position said base plate at a selected location on the wall surface.

11. The fixture according to claim 10 wherein said base plate has a positioning indicator adjacent said positioning aperture for cooperation with the mark on the wall surface.

12. The fixture according to claim 11 wherein said positioning indicator includes at least one line for alignment with the mark on the wall surface.

13. The fixture according to claim 1 wherein said base plate has a pair of side edges and said end edges and said side edges of said base plate extend forwardly from said base plate into said open rear side of said housing.

14. The fixture according to claim 1 wherein said upper and lower end edges of said base plate extend forwardly and outwardly from said base plate.

15. The fixture according to claim 1 wherein said means for detachably coupling includes at least one threaded fastener extending through said frame for releasably engaging one of said end edges of said base plate.

16. The fixture according to claim 1 wherein said means for detachably coupling includes at least one flange attached to said frame for releasably engaging one of said end edges of said base plate and at least one setscrew extending through said frame for releasably engaging another one of said end edges of said base plate.

17. The fixture according to claim 1 wherein at least one of said upper and lower end edges of said base plate extends forwardly and outwardly from said base plate and said means for detachably coupling includes at least one threaded fastener extending through said frame for releasably engaging said one of said end edges of said base plate whereby when said base plate is attached to the wall surface, said housing is drawn toward the wall surface as said one threaded fastener is rotated into engagement with said one end edge.

18. A surface mounted fixture for elevators having at least one indicating device mounted therein to signal an operational state of an associated elevator comprising:

a generally planar face plate having edges and at least one aperture formed therein for receiving the indicating device;

a frame surrounding said edges of said face plate and releasably retaining said face plate, said frame and said face plate forming a box-like housing having side walls extending rearwardly from said face plate and an open rear side for facing toward a wall surface;

a generally planar base plate having upper and lower end edges and means for attachment to the wall surface, said base plate being sized for insertion into said open rear side of said housing and having a positioning aperture formed therein;

a positioning indicator on said base plate adjacent said positioning aperture; and means for detachably coupling said frame to said base plate at said open rear side of said housing whereby when said base plate is attached to the wall surface, said upper and lower end edges of said base plate extend into said open rear side of said housing, said means for detachably coupling releasably engages said upper and lower end edges of said base plate and said housing encloses and covers said base plate in cooperation with the wall surface.

19. A surface mounted fixture for elevators having at least one indicating device mounted therein to signal an operational state of an associated elevator comprising:

a generally planar face plate having edges and at least one aperture formed therein for receiving the indicating device;

a frame surrounding said edges of said face plate and releasably retaining said face plate, said frame and said face plate forming a box-like housing having side walls extending rearwardly from said face plate and an open rear side for facing toward a wall surface, said frame including an upper frame portion, a lower frame portion and two side frame portions;

fastener means for releasably coupling said frame portions together, said side frame portions having means for slidably retaining said fastener means;

a generally planar base plate having upper and lower end edges and means for attachment to the wall surface, said base plate being sized for insertion into said open rear side of said housing; and means for detachably coupling said frame to said base plate at said open rear side of said housing whereby when said base plate is attached to the wall surface, said upper and lower end edges of said base plate extend into said open rear side of said housing, said means for detachably coupling releasably engages said upper and lower end edges of said base plate and said housing encloses and covers said base plate in cooperation with the wall surface.

20. The fixture according to claim 19 wherein said means for slidably retaining said fastener means includes a generally U-shaped channel formed in each of said side frame portions and said fastener means includes a pair of tabs attached to each of said upper and lower frame portions and a plurality of setscrews, each of said tabs for insertion into said channel of an adjacent one of said side frame portions, each of said tabs having a threaded aperture formed therein for receiving one of said setscrews whereby rotation of said setscrews into engagement with associated walls of said channels releasably couples said tabs to said side frame portions.

* * * * *